Nov. 15, 1960 D. CLEJAN 2,960,043
RAILWAY CARS FOR TRANSPORTING ROAD VEHICLES
Filed Dec. 31, 1956 5 Sheets-Sheet 2

INVENTOR.
DEODAT CLEJAN
BY
Byerly, Townsend & Watson
ATTORNEYS

Nov. 15, 1960  D. CLEJAN  2,960,043
RAILWAY CARS FOR TRANSPORTING ROAD VEHICLES
Filed Dec. 31, 1956  5 Sheets-Sheet 3

INVENTOR.
DEODAT CLEJAN
BY
Byerly, Townsend & Watson
ATTORNEYS

United States Patent Office 2,960,043
Patented Nov. 15, 1960

2,960,043

RAILWAY CARS FOR TRANSPORTING ROAD VEHICLES

Deodat Clejan, New York, N.Y., assignor, by mesne assignments, to General American Transportation Corporation, Chicago, Ill., a New York corporation Filed Dec. 31, 1956, Ser. No. 631,955

14 Claims. (Cl. 105—368)

This invention relates to improvements in railway cars for transporting road vehicles, and aims particularly to provide both conventional and special railway cars with means for easily and securely retaining interchangeably either conventional road vehicles or those adapted for carriage by special railway cars and to protect said road vehicles from longitudinal shocks.

Pending application Serial No. 464,535, filed October 25, 1954, now abandoned, by Etienne De Grandpre, and owned by the owner of this application, describes a rail-and-road transportation system including special railway cars having narrow frames lying wholly between the inner sides of the wheels of their running gears and providing an outwardly facing track of narrow gauge for supporting road vehicles, combined with road vehicles which have, in addition to their road wheels, inwardly facing flanged wheels mounted between the planes of the inner surfaces of their road wheels and supported on the outwardly facing track provided by the frames of the railway cars. Although this system is the best and most economical of which applicant is aware for such transportation, there still exist a considerable number of railway vehicles and road vehicles which are not at present adapted for use in said system.

The present invention makes it possible to obtain many of the benefits of the system described in the aforesaid application Serial No. 464,535, while at the same time making possible the employment of any rail-and-road combination of existing railway cars, existing road vehicles, special railway vehicles and special road vehicles where said special vehicles are improved types capable of employment in the above-mentioned system of the aforesaid application Serial No. 464,535. In addition, the present invention also makes possible the employment in each such combination of means for protection of the road vehicle from longitudinal shocks similar to those described in pending application Serial No. 593,848, filed by me on June 26, 1956, and owned by the owner of the present application.

In accordance with the present invention the railway vehicle is provided with a pair of parallel roadways for supporting the road wheels of a road vehicle and a central axial beam projecting above the roadways. The beam provides an outwardly facing track for supporting the inwardly facing flanged wheels on road vehicles equipped for use in the system of the aforesaid application Serial No. 464,535. Thus, the railway vehicle may carry road vehicles supported either by their road wheels or by such flanged wheels. In practice the railway car may be a standard railroad flat car in which the beam is mounted on the top of its center sill and the floor of the car reinforced, or it may be a car of an improved type in which the beam is incorporated in the car's center sill and the roadways are mounted on either side of the center sill. In either case the road vehicle may be supported either by road wheels or by auxiliary flanged wheels. The road vehicle, which in practice is usually of the type known as a semi-trailer, is connected to the railway car by means of a hook which engages the axle of the road vehicle. The hook in turn is connected through a drawndown mechanism to a cushioned longitudinally movable element on the car.

In the preferred form of my invention the cushioned longitudinally movable element, similar to that shown in the aforesaid application Serial No. 593,848, is contained in the beam and includes two parallel longitudinal rods slidably mounted on the beam and a double-acting cushioning device connected between the rods and the beam. The drawndown mechanism is connected to said rods by a saddle and includes a threaded vertical rod adapted to be moved vertically by rotation of an actuating shaft connected to the rod through worm gearing.

The hook is connected to the free end of the vertical rod or it may be formed by a bend in the free end of the rod. It may be of a simple inverted U-shape as in the latter case, but preferably it is a self-locking latch hook of the type hereinafter described. In practice, two hooks and two vertical threaded rods are employed.

The accompanying drawings show the application of the invention to railway cars and road vehicles.

Figure 1:
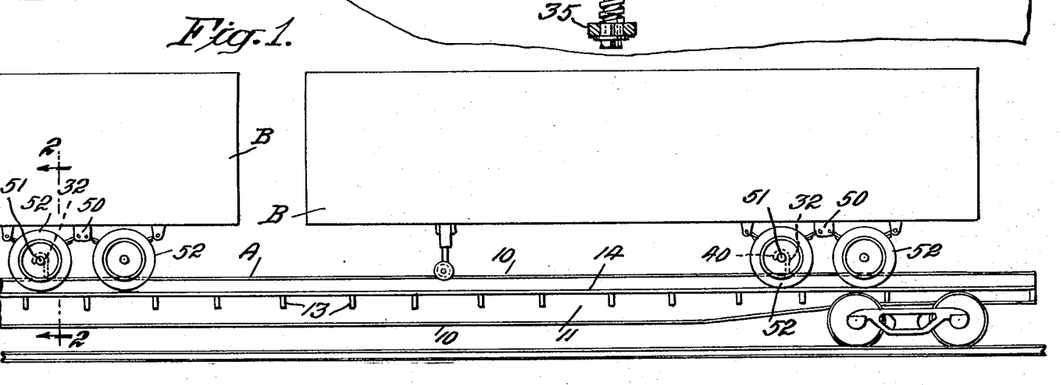
Fig. 1 is a side view of an improved railway car showing two road vehicles, specifically semi-trailers, mounted on the car in accordance with my invention.
Figure 2:
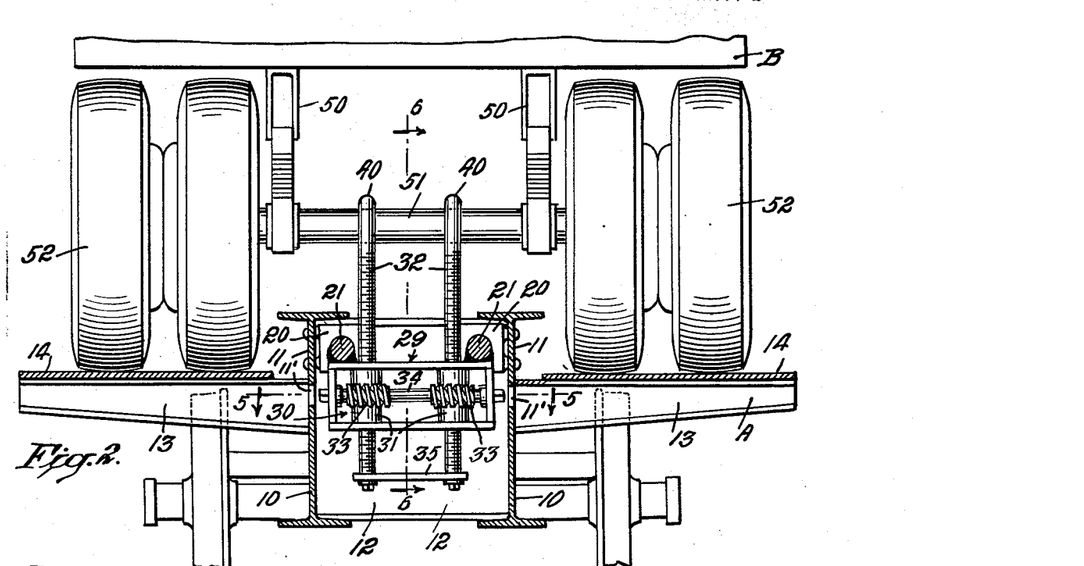
Fig. 2 is an enlarged transverse section taken on the line 2—2 of Fig. 1, and showing the road wheels of a road vehicle resting on the platform of an improved railway car.
Figure 3:
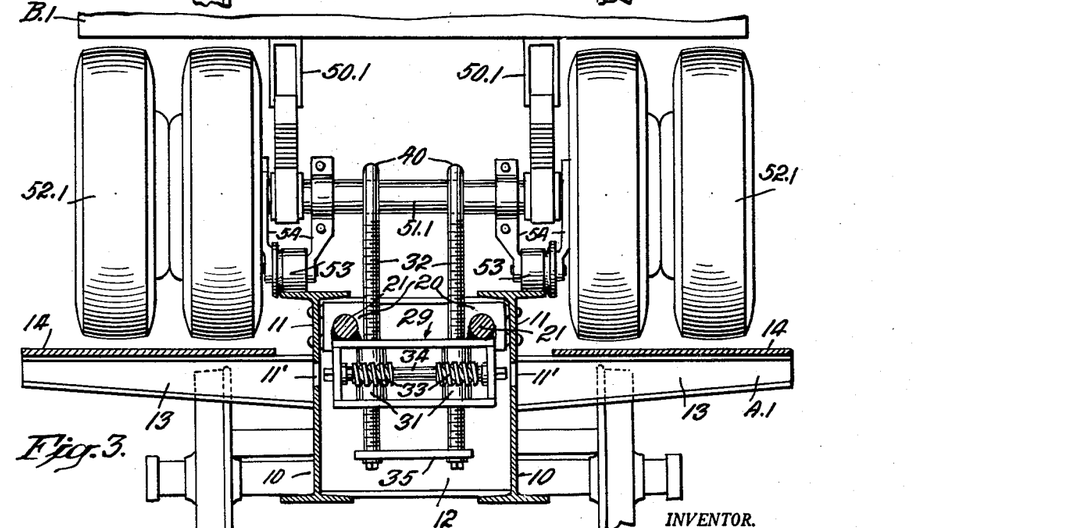
Fig. 3 is an enlarged transverse section view corresponding to Fig. 2, but showing auxiliary flanged wheels of a road vehicle resting on the central axial beam of an improved railway car.

Referring now to Figs. 1, 2 and 3 of the drawings, the system of freight transportation there illustrated, and embodying the features of the present invention, essentially comprises a railway car A, carrying two road vehicles B of the semi-trailer type. In the arrangement, each of the two trailers B may be of the type shown in Fig. 2, or each of the two trailers B may be of the type shown in Fig. 3, or one of each of these two types of trailers B may be employed.

The railway car A shown in Figs. 1, 2 and 3 is an improved car having a frame including a center sill 10 composed of two longitudinal I-beams 11 connected by transverse beams 12. The center sill 10 is mounted on the usual main track trucks in a way which is well known to the art. The upper outer flanges of the I-beams 11 form tracks which may be used to support auxiliary flanged wheels secured to a trailer or other road vehicle. Transverse members 13 are secured to and extend from the sides of the center sill. These transverse members 13 are connected to the outer sides of I-beams 11 in a way well known to the art. Platforms or roadways 14 running the length of the center sill are mounted on members 13. These platforms preferably are of reinforced steel instead of wood so that they can support the road wheels of a road vehicle.

Provision may be made in a well-known manner for the mounting of transverse members 13 at various heights on I-beams 11, so that the height of platforms 14 can be raised or lowered as desired. Thus, the platforms could be raised so as to be level with the top of the center sill so that the car could be adapted to conventional flat car use, or, with suitable holes provided in the platforms for the railway car wheels, the platforms could be lowered to a point just above the railway car axle so as to give the car the lowest possible center of gravity.

Figure 4:
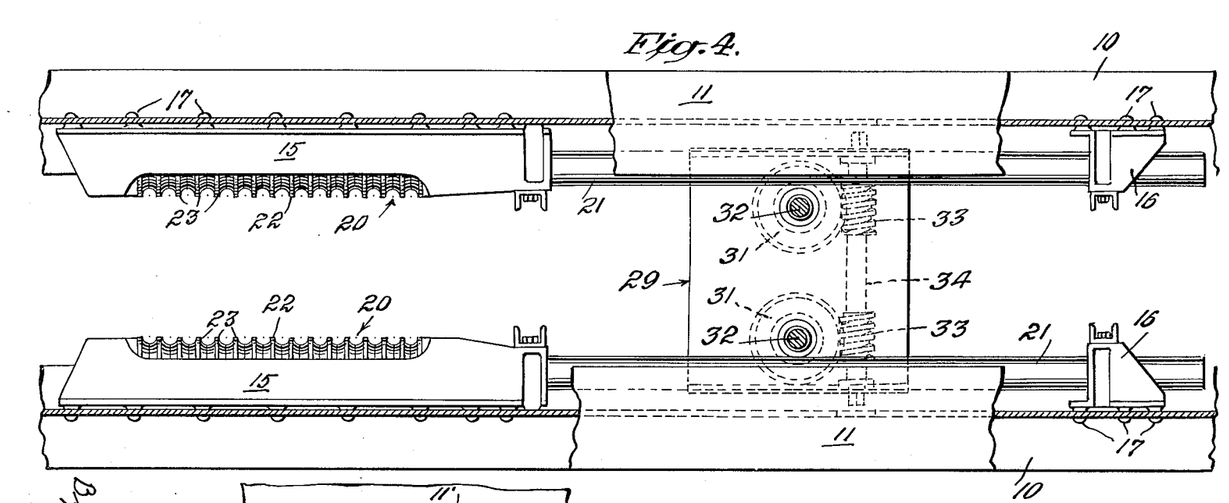
Fig. 4 is a plan view of part of the central axial beam of the railway car shown in Figs. 2 and 3 with parts of the upper flange of the I-beams broken away.
Figure 6:
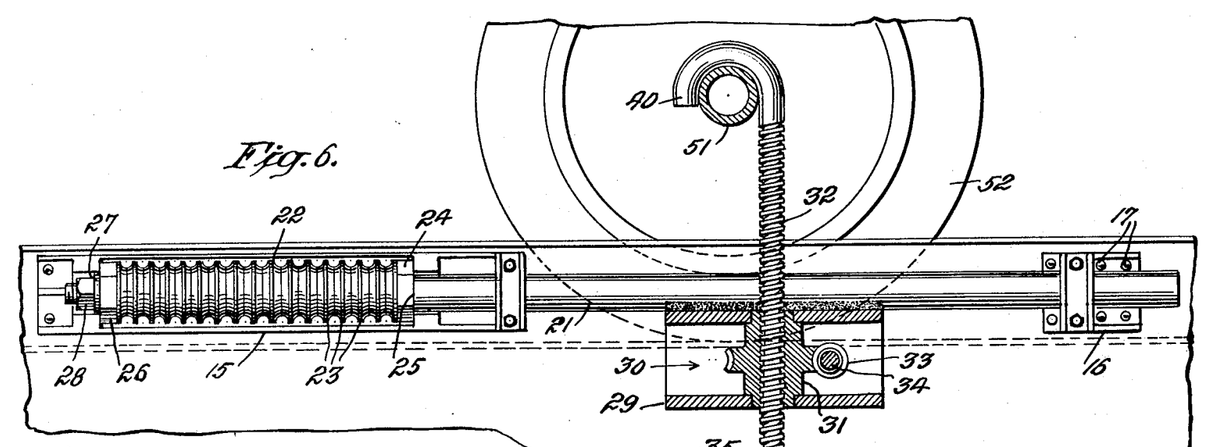
Fig. 6 is a fragmentary enlarged section view taken on line 6—6 of Fig. 2 in which part of the road vehicle is omitted for the sake of clarity.

Attached to center sill 10 are two cushioned longitudinally movable elements 20 which are best shown in Figs. 4 and 6. Elements 20 include rods 21 which are mounted for longitudinal movement under the inner upper flanges of I-beams 11. Bearings for the rods are provided in long housings 15 and brackets 16 secured to the I-beams 11 by rivets 17. Each rod 21 is connected at one or both of its ends to a cushioning device or shock absorber 22 located in one of the housings 15. In the form shown, the shock absorber consists of a series of rubber mats 23 enclosed between a disc 24 bearing against shoulder 25 on rod 21 and a disc 26 bearing against a washer 27 held by a nut 28 on the extreme end of rod 21. It is apparent that the shock absorber described will cushion movement of rod 21 in each longitudinal direction. Finally a saddle 29 is connected firmly to rods 21.

Figure 5:
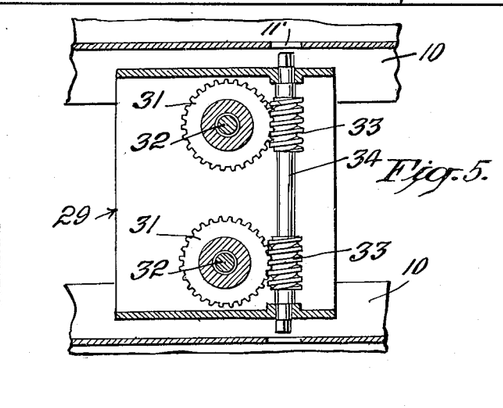
Fig. 5 is a section view taken on line 5—5 of Fig. 2.

Saddle 29 contains a drawdown mechanism 30 which is best shown in Figs. 5 and 6. Drawdown mechanism 30 includes parts 31, each constituting a combined nut and worm gear and each journaled vertically in saddle 29. Threaded vertical rods 32 are threaded through the nut portion of parts 31. Worms 33 which mesh respectively with the worm gear portions of parts 31 are mounted on actuating shaft 34 which is journaled horizontally in saddle 29 transversely of center sill 10. Shaft 34 is in register with holes 11' in I-beams 11 so that a crank rod may be readily attached to either end of said shaft in order to actuate it by means of a crank from the outside of the I-beams. Connecting the bottom of the vertical threaded rods 32 is a member 35 restraining the rods from rotating with parts 31 so that their only movement will be vertical. Attached at the top of each of said threaded vertical rods 32 is a hook 40. Hooks 40 may be simply U-shaped ends of said vertical rods as shown in Fig. 6.

The road vehicle B has a frame 50 on which are journaled axles 51 having road wheels 52 connected thereto. As shown in Figs. 1 and 2 the road wheels 52 of road vehicle B rest on platforms 14 of railway vehicle A.

Road vehicle B.1, shown in Fig. 3, is the same as road vehicle B, as shown in Fig. 2, except that in addition to road wheels 52.1 it has auxiliary flanged wheels 53 connected to axle 51.1 by frames 54. These wheels 53 are so constructed and located that they may be supported on the tracks formed by the upper outer flanges of I-beams 11 on car A so that they, instead of road wheels 52.1, support the road vehicle B.1 on railway car A.

When the road vehicle B is to be rolled on to the railway car the actuating shaft 34 is rotated, for example, by cranking, in the direction causing downward movement of the threaded vertical rods 32 until the hooks 40 are low enough for one or more axles 51 to pass over the hooks 40. The rotation of the actuating shaft is then reversed until hooks 40 are above the level of an axle 51. The vehicle B is then moved into position in which an axle 51 is immediately below hooks 40, and then the rotation of actuating shaft 34 is reversed again and the hooks 40 are drawn down by rods 32 into engagement with axle 51. The vertical connection of axle 51 through the hooks 40 and tie-down mechanism 30 to rods 21 holds the road vehicle B firmly on the flat car A and the cushioning devices 22 connected to rods 21 between the ends of long housings 15 cushions the road vehicle against longitudinal shocks.

When road vehicle B.1 is rolled on to the railway car A, its wheels 53 rest on the tracks formed by the upper outer flanges of I-beams 11. The sequence of procedure for moving vehicle B.1 and rotating actuating rod 34 in order to engage axle 51.1 with hooks 40 is the same as that described in connection with vehicle B.

Figure 7:
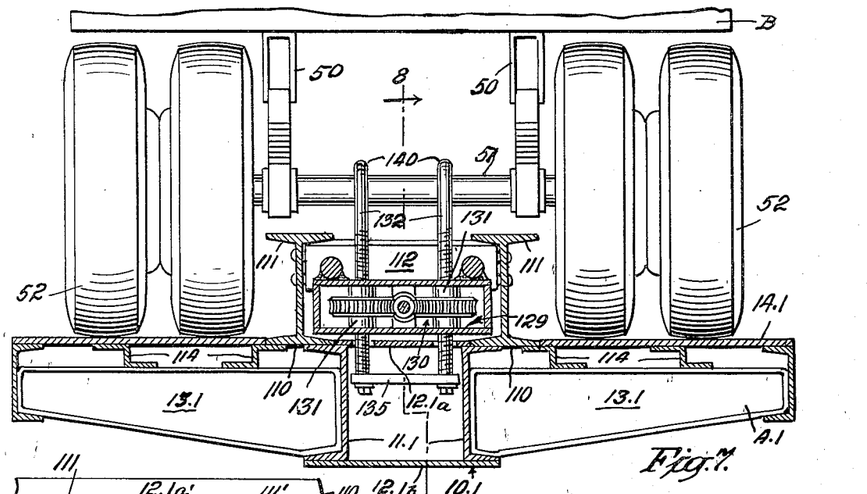
Fig. 7 is an enlarged transverse section view corresponding to a part of Fig. 2, but showing a conventional flat car equipped with a central axial beam and carrying a road vehicle supported on its road wheels.

Fig. 7 shows a transverse section view of a portion of a conventional flat car which is designated A.1 to distinguish it from railway car A. The under carriage of the car, which is not shown, is the conventional under carriage which would be connected to such a car in the usual way. Car A.1 has a center sill 10.1 consisting of two longitudinal channel beams 11.1 connected by transverse members 12.1a and 12.1b. To beams 11.1 transverse members 13.1 are attached in a well-known manner. Running longitudinally of the car and supported on said transverse members are floor supports 114 which are normally provided in a flat car to support the flooring. In place of the usual wood flooring, steel flooring is used to provide platforms or roadways 14.1 to support the road wheels of road vehicle B.

Between platforms 14.1 a central axial beam 110 is mounted on top of center sill 10.1. Beam 110 may be secured to the center sill in any well-known manner, such as welding. It should be noted that in car A the functions of the central axial beam and the center sill were united in center sill 10. Beam 110 is composed of two longitudnial I-beams 111 connected by transverse beams 112. The upper outer flanges of the I-beams 111 form tracks which may be used to support auxiliary flanged wheels such as wheels 53 of road vehicle B.1. The cushioned longitudinally movable element 120, connected to central axial beam 110 and the associated saddle 129 and hook 140 are arranged and constructed in the same way as the corresponding parts described in connection with railway car A.

Figures 8, 9:
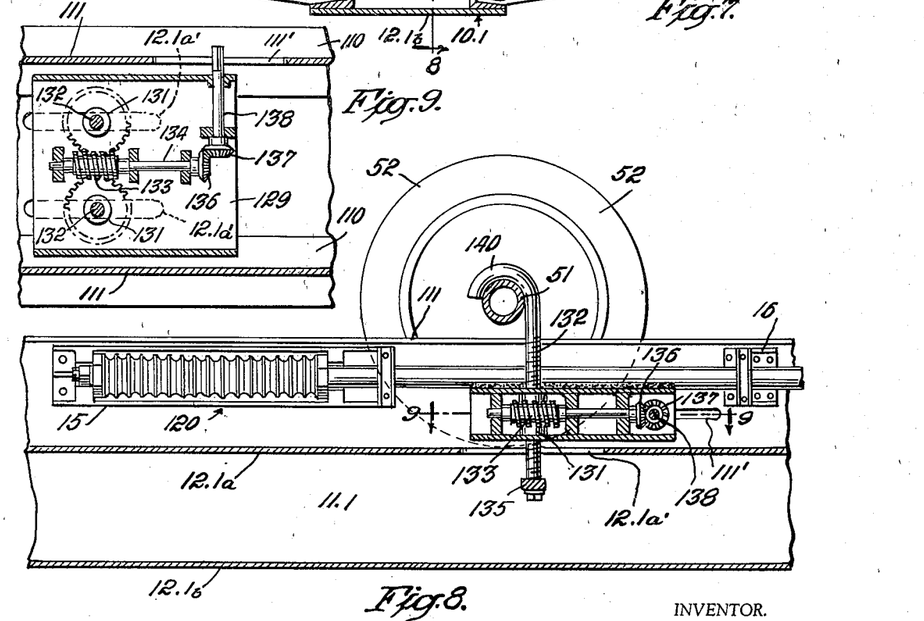
Fig. 8 is a fragmentary section view taken on line 8—8 of Fig. 7 in which part of the road vehicle is omitted for the sake of clarity.
Fig. 9 is a section view taken on line 9—9 of Fig. 8.

Drawdown mechanism 130 differs from drawdown mechanism 30 in that shaft 134 is journaled in saddle 129 longitudinally of the car and only one worm 133 is mounted on said shaft and it engages the worm gear portions of the combined nut and worm gear parts 131 simultaneously on opposite sides. It is therefore apparent that in order to have vertical rods 132 work in unison they must have threads of opposite hands, and of course the nut portions of parts 131 must be properly threaded to correspond with their respective rods 132. This variation from drawdown mechanism 30 is made necessary by the fact that the actuating shaft 134, if located in the same relative position as shaft 34, would be extremely difficult to manipulate because of the presence of road wheel 52. Therefore, a bevel gear arrangement is provided whereby at one end of shaft 134, journaled as aforesaid, is mounted a bevel gear 136 which meshes with a second bevel gear 137 on the end of a shaft 138 which is in turn journaled in the saddle 129 at the right angles to shaft 134. Shaft 138 is located in register with holes 111' in I-beams 111 so that it may be actuated in the same way as shaft 34.

In addition, there are holes 12.1a' provided in member 12.1a permitting rods 132 to pass below the level of platform 14.1. This permits sufficient vertical travel of rods 132 for the carrying of road vehicles B and B.1 interchangeably on car A.1.

The loading of road vehicles B and B.1 on railway car A.1 is accomplished in the same manner as in the case of car A, and in this connection, shaft 138 is moved in a manner to give rods 132 the same vertical movement as rods 32.

It will be apparent from the foregoing description that both railway car A and railway car A.1 may carry road vehicles B.1 as well as B. Each of these railway cars has tracks for supporting auxiliary wheels and platforms for supporting road wheels, and each provides the same type of tie-down for the road vehicles.

Figure 10:
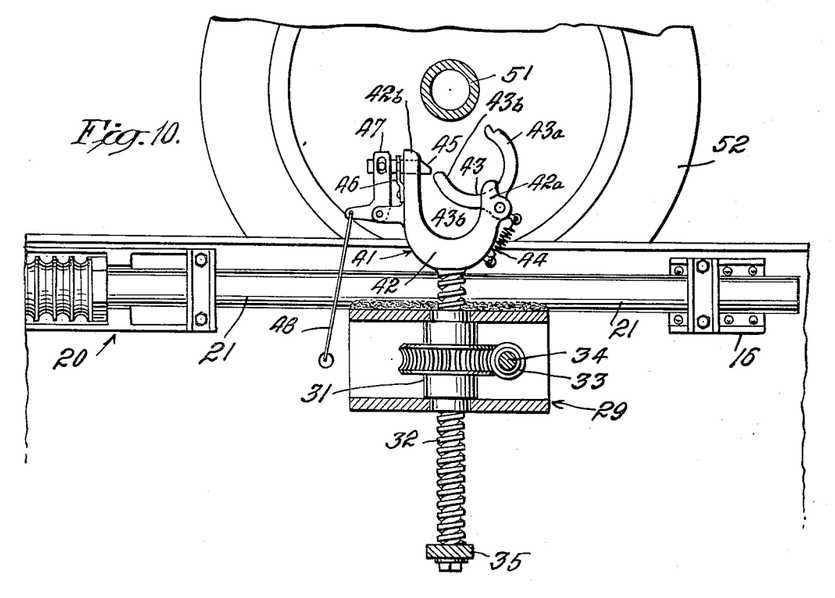
Fig. 10 is a fragmentary enlarged section view corresponding to part of Fig. 6, but showing an improved hook for the road vehicle axle in its disconnected position.
Figure 11:
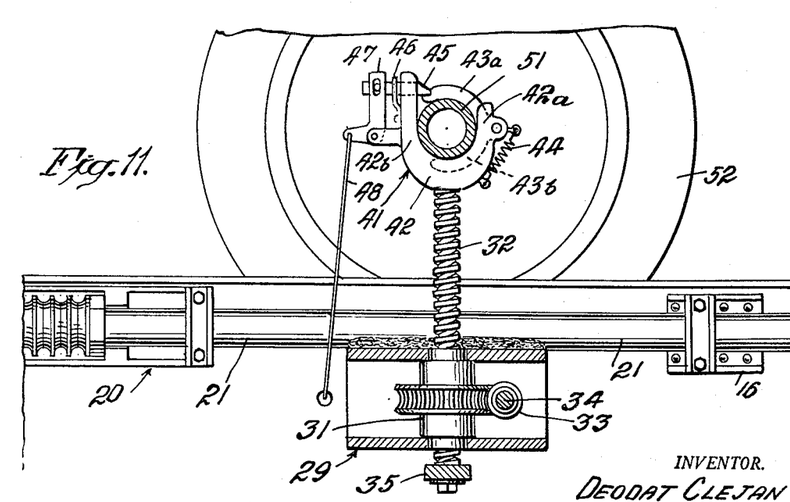
Fig. 11 is a fragmentary enlarged section view corresponding to Fig. 10, but showing the hook in its connected position.

In place of the hook 40 on car A and hook 140 on car A.1 a hook 41, shown in Figs. 10 and 11, may be employed. This hook, which will be described with reference to car A, includes a frame 42 having a U-shape with the bottom of the U fastened to the end of vertical rod 32. Near one free end of the arm 42a of the frame is pivotally attached an arcuate lever 43, pivoted about a point approximately equidistant between its ends. Lever 43 is so shaped that when one arm 43a covers the opening of the U of frame 42 the inner surface of other arm 43b is substantially parallel to the inner surface of the arm 42a of the frame. When arm 43a is moved away from the opening of the frame the arm 43b moves up toward the opening and tends to cover it. A spring 44 connected between frame 42 and lever 43 normally keeps arm 43a in its uncovering position. On the arm 42b of the frame 42 is attached a spring loaded detent 45. A spring 46 connected between frame arm 42b and detent 45 keeps the free end of the detent normally projecting into the space between arms 42a and 42b. Connected to the other end of detent 45 is one end of an operating lever 47 which is pivoted about a projection from arm 42b and has an actuating rod 48 connected to its other end.

In operation, the hook 41 is normally open. Axle 50 or 50.1 is placed in position over the hook 32 and the hook is raised by means of the drawdown mechanism 30. The axle depresses detent 45 and lever arm 43b against their respective springs. In so doing, the arm 43a of the lever 43 is passed around the top side of the axle until it too depresses detent 45. When arm 43a has passed beneath the detent 45 spring 46 urges the detent over the arm 43a so that arm 43a becomes locked beneath the detent. The drawdown mechanism may then be reversed so as to draw down on the axles to retain them firmly in grip. To release the axles the drawn down mechanism is again reversed to release the pressure of the arm 43a on the axles. Then rod 48 may be pulled, and this in turn withdraws detent 45 from the top of arm 43a. The drawdown mechanism is again reversed and the hook is lowered until the axle is clear of it. The road vehicle is then free to move. It will be apparent from the foregoing that the hook 41 could be employed in a similar fashion on car A.1.

It will be apparent that the use of hook 41 would facilitate loading and unloading of vehicles since it would require less moving of the road vehicles than in the case of hooks 40 and 140. Also, it will be apparent that when hook 41 is employed on either car A or car A.1 the vertical travel required of rods 32 and 132, respectively, will be less than that required when hooks 40 and 140 are employed.

Recapitulating: in the railway car A of Figs. 1, 2 and 3, the combination tie-down and shock-absorber mechanism incorporated therein accommodates limited rolling movements fore-and-aft of the trailer B of Fig. 2 on its road wheels 52 in engagement with the roadways 14 of the railway car and also accommodates limited rolling movements fore-and-aft of the trailer B.1 of Fig. 3 on its rollers 53 in engagement with the rails (the top flanges of the I-beams 11) of the auxiliary railway track provided on the top of the center sill 10 of the railway car.

While there has been described what is at present considered to be the preferred embodiment of the invention, it will be understood that various modifications may be made therein, and it is intended to cover in the appended claims all such modifications as fall within the true spirit and scope of the invention.

What I claim is:

1. A railway car for transporting indiscriminately road vehicles of first and second types, wherein the first type of road vehicle includes a chassis carrying road wheels of standard road gauge, and the second type of road vehicle includes a chassis carrying both road wheels of standard road gauge and track rollers of given narrow gauge depending from the underportion of the chassis and disposed inwardly of and above the road wheels carried thereby; said railway car comprising a longitudinally extending center sill, a pair of trucks supporting the opposite ends of said center sill, a pair of longitudinally extending and laterally spaced-apart rails provided on the top of said center sill and constituting a track of said given narrow gauge, a pair of longitudinally extending and laterally spaced-apart platforms carried by the opposite sides of said center sill and projecting outwardly therefrom and disposed below the top thereof and constituting a roadway of said standard road gauge, said roadway being arranged to engage and to support the road wheels of the first type road vehicle so as to mount the same upon the top of said center sill with the chassis thereof straddling said track and with the underportion of the chassis positioned above said track and out of contact therewith, said track being arranged to engage and to support the track rollers carried by the chassis of the second type road vehicle so as to mount the same upon the top of said center sill with the road wheels thereof projecting outwardly over said roadway and with the road wheels positioned above said roadway and out of contact therewith, a vehicle connecting and securing device carried by said center sill, a connector element carried by said connecting and securing device and having a retracted position disengaging and releasing a mounted road vehicle and a relatively low projected position engaging and holding a mounted road vehicle of the first type and a relatively high projected position engaging and holding a mounted road vehicle of the second type, said connector element in its retracted position being disposed adjacent to the top of said center sill and in each of its projected positions being disposed well above said center sill, and means for selectively operating said connector element between its retracted and projected positions.

2. A railway car for transporting indiscriminately road vehicles of first and second types, wherein the first type of road vehicle includes a chassis carrying road wheels of standard road gauge, and the second type of road vehicle includes a chassis carrying both road wheels of standard road gauge and track rollers of given narrow gauge depending from the underportion of the chassis and disposed inwardly of and above the road wheels carried thereby; said railway car comprising a longitudinally extending center sill, a pair of trucks supporting the opposite ends of said center sill, a pair of longitudinally extending and laterally spaced-apart rails provided on the top of said center sill and constituting a track of said given narrow gauge, a pair of longitudinally extending and laterally spaced-apart platforms carried by the opposite sides of said center sill and projecting outwardly therefrom and disposed below the top thereof and constituting a roadway of said standard road gauge, said roadway being arranged to engage and to support the road wheels of the first type road vehicle so as to mount the same upon the top of said center sill with the chassis thereof straddling said track and with the underportion of the chassis positioned above said track and out of contact therewith, said track being arranged to engage and to support the track rollers carried by the chassis of the second type road vehicle so as to mount the same upon the top of said center sill with the road wheels thereof projecting outwardly over said roadway and with the road wheels positioned above said roadway and out of contact therewith, a vehicle connecting and securing device carried by said center sill, a connector element carried by said connecting and securing device and having a retracted position disengaging and releasing a mounted road vehicle and a relatively low projected position engaging and holding a mounted road vehicle of the first type and a relatively high projected position engaging and holding a mounted road vehicle of the second type, said connector element in its retracted position being disposed adjacent to the top of said center sill and in each of its projected positions being disposed well above said center sill, and manually operable means carried by said center sill for selectively operating said connection element between its retracted and projected positions.

3. A railway car for transporting indiscriminately road vehicles of first and second types, wherein the first type of road vehicle includes a chassis carrying road wheels of standard road gauge, and the second type of road vehicle includes a chassis carrying both road wheels of standard road gauge and track rollers of given narrow gauge depending from the underportion of the chassis and disposed inwardly of and above the road wheels carried thereby; said railway car comprising a longitudinally extending center sill, a pair of trucks supporting the opposite ends of said center sill, a pair of longitudinally extending and laterally spaced-apart rails provided on the top of said center sill and constituting a track of said given narrow gauge, a pair of longitudinally extending and laterally spaced-apart platforms carried by the opposite sides of said center sill and projecting outwardly therefrom and disposed below the top thereof and constituting a roadway of said standard road gauge, said roadway being arranged to engage and to support the road wheels of the first type road vehicle so as to mount the same upon the top of said center sill with the chassis thereof straddling said track and with the underportion of the chassis positioned above said track and out of contact therewith, said track being arranged to engage and to support the track rollers carried by the chassis of the second type road vehicle so as to mount the same upon the top of said center sill with the road wheels thereof projecting outwardly over said roadway and with the road wheels positioned above said roadway and out of contact therewith, motion-limiting means carried by said center sill, a connector element carried by said motion-limiting means and having a retracted position disengaging and releasing a mounted road vehicle and a relatively low projected position engaging and holding a mounted road vehicle of the first type and a relatively high projected position engaging and holding a mounted road vehicle of the second type, said connector element in its retracted position being disposed adjacent to the top of said center sill and in each of its projected positions being disposed well above said center sill, and means for selectively operating said connector element between its retracted and projected positions; whereby said connector element in either of its projected positions connects the mounted and held road vehicle to said motion-limiting means, and whereby said motion-limiting means is arranged to effect limited fore-and-aft rolling movements of the mounted and connected road vehicle longitudinally of said center sill regardless of the type thereof.

4. The railway car set forth in claim 3, wherein said motion-limiting means is also arranged to effect cushioning of the limited fore-and-aft rolling movements of the mounted and connected road vehicle longitudinally of said center sill so as to minimize the transmission of shocks from said center sill to the mounted and connected road vehicle regardless of the type thereof.

5. A railway car for transporting a road vehicle including a chassis provided with an axle carrying road wheels; said railway car comprising a longitudinally extending center sill, a pair of trucks supporting the opposite ends of said center sill, means including structure carried by said center sill for mounting a road vehicle upon the top of said center sill with the axle thereof straddling the top of said center sill and disposed thereabove and with the road wheels thereof projecting outwardly from the opposite sides of said center sill and depending from the mounted road vehicle below the top of said center sill, a vehicle connecting and securing device carried by said center sill, a connector element carried by said connecting and securing device and selectively operative into active and inactive positions with respect to the axle of a road vehicle mounted upon the top of said center sill, said connector element in its active position being disposed well above the top of said center sill and engaging and holding the axle of the mounted road vehicle and in its inactive position being disposed adjacent to the top of said center sill and disengaging and releasing the axle of the mounted road vehicle, said connector element in its active position being variably located above the top of said center sill as required to project over and to hold-down upon the axle of the mounted road vehicle, and means for selectively operating said connector element between its inactive and active positions and for variably locating said connector element in its active position.

6. The railway car set forth in claim 5, wherein said means for selectively operating said connector element between its inactive and active positions and for variably locating said connector in its active position includes a manually operable member carried by said center sill.

7. The railway car set forth in claim 5, wherein said connector element essentially comprises hook means that is operative into its active position to hook-over and to pull-down upon the axle of the mounted road vehicle and that is operative into its inactive position to unhook and to release the axle of the mounted road vehicle.

8. A railway car for transporting a road vehicle including a chassis provided with an axle carrying road wheels; said railway car comprising a longitudinally extending center sill, a pair of trucks supporting the opposite ends of said center sill, means including structure carried by said center sill for mounting a road vehicle upon the top of said center sill with the axle thereof straddling the top of said center sill and disposed thereabove and with the road wheels thereof projecting outwardly from the opposite sides of said center sill and depending from the mounted vehicle below the top of said center sill, motion limiting and cushioning means carried by said center sill, a connector element carried by said motion limiting and cushioning means and selectively operative into active and inactive positions with respect to the axle of a road vehicle mounted upon the top of said center sill, said connector element in its active position being disposed well above the top of said center sill and engaging and holding the axle of the mounted road vehicle and in its inactive position being disposed adjacent to the top of said center sill and disengaging and releasing the axle of the mounted road vehicle, said connector element in its active position being variably located above the top of said center sill as required to project over and to hold-down upon the axle of the mounted road vehicle, and means for selectively operating said connector element between its inactive and active positions and for variably locating said connector element in its active position, whereby said connector element in its active position connects the mounted and held road vehicle to said motion limiting and cushioning means, and whereby said motion limiting and cushioning means is arranged to effect limited and cushioned fore-and-aft movements of the mounted and connected road vehicle longitudinally of said center sill so as to minimize the transmission of shocks from said center sill to the mounted and connected road vehicle.

9. A railway car for transporting a road vehicle including a chassis provided with an axle carrying road wheels; said railway car comprising a longitudinally extending center sill, a pair of trucks supporting the opposite ends of said center sill, means including structure carried by said center sill for mounting a road vehicle upon the top of said center sill with the axle thereof straddling the top of said center sill and disposed thereabove and with the road wheels thereof projecting outwardly from the opposite sides of said center sill and depending from the mounted road vehicle below the top of said center sill, vehicle connecting and securing means carried by said center sill, a connector element carried by said connecting and securing means and mounted thereon for vertical movements with respect thereto into active and inactive positions with respect to the axle of a road vehicle mounted upon the top of said center sill, said connector element in its active position being disposed well above the top of said center sill and adjacent to the axle of the mounted road vehicle and in its inactive position being disposed adjacent to the top of said center sill and well below the axle of the mounted road vehicle, means for selectively raising and lowering said connector element with respect to the top of said center sill so as selectively to operate said connector element into its active and inactive positions with respect to the axle of the associated and mounted road vehicle, said last-mentioned means accommodating variable location of said connector element above the top of said center sill in its active position as required by the adjacent position of the axle of the associated and mounted road vehicle, said connector element in its active position being selectively operative into open and closed positions with respect to the axle of an associated and mounted road vehicle, means biasing said connector element into its open position and responsive to the reception therein of the axle of the associated and mounted road vehicle to effect operation thereof against said bias into its closed position in order to effect holding of the received axle, and manually operable means for tripping said connector element so that it is operated by said bias back into its open position in order to effect releasing of the held axle.

10. A railway car for transporting a road vehicle including a chassis provided with an axle carrying road wheels; said railway car comprising a longitudinally extending center sill, a pair of trucks supporting the opposite ends of said center sill, means including structure carried by said center sill for mounting a road vehicle upon the top of said center sill with the axle thereof straddling the top of said center sill and disposed thereabove and with the road wheels thereof projecting outwardly from the opposite sides of said center sill and depending from the mounted road vehicle below the top of said center sill, a longitudinally extending shaft mounted upon said center sill for longitudinal sliding movements with respect thereto, a cushioning device connecting said shaft to said center sill, an upstanding member carried by said shaft and mounted thereon for vertical movements with respect to the top of said center sill, a connector element carried upon the upper end of said member and selectively operative into active and inactive positions with respect to the axle of an associated road vehicle mounted upon the top of said center sill, said connector element in its active position engaging and holding the axle of the associated and mounted road vehicle and in its inactive position disengaging and releasing the axle of the associated and mounted road vehicle, whereby said connector element in its active position connects the associated and mounted road vehicle via said member to said shaft in order that the fore-and-aft movements of the mounted and connected road vehicle longitudinally of said center sill are cushioned by said cushioning device so as to minimize the transmission of shocks from said center sill to the mounted and connected road vehicle, and means for selectively raising and lowering said member with respect to the top of said center sill so as selectively to operate said connector element into its active and inactive positions with respect to the axle of the associated and mounted road vehicle, said last-mentioned means accommodating variable location of said connector element above the top of said center sill in its active position as required to effect holding of the axle of the associated and mounted road vehicle.

11. A railway car comprising a longitudinally extending center sill, a pair of trucks supporting the opposite ends of said center sill, a pair of longitudinally extending and laterally spaced-apart shafts mounted upon said center sill for longitudinal sliding movements with respect thereto, a pair of cushioning devices respectively connecting said shafts to said center sill, a laterally extending saddle interconnecting said shafts, a pair of laterally spaced-apart upstanding members carried by said saddle and mounted thereon for vertical movements with respect to the top of said center sill, a pair of connector elements respectively carried upon the upper ends of said members and respectively selectively operative into active and inactive positions with respect to two laterally spaced-apart portions of a freight carrier mounted upon the top of said center sill, said connector elements in their active positions respectively engaging and connecting to the two laterally spaced-apart portions of the associated and mounted freight carrier, whereby said connector elements in their active positions connect the associated and mounted freight carrier via said members and said saddle to said shafts in order to effect cushioning of the fore-and-aft movements of the mounted and connected freight carrier longitudinally of said center sill so as to minimize the transmission of shocks from said center sill to the mounted and connected freight carrier, and mechanism for selectively raising and lowering simultaneously said members with respect to the top of said center sill so as selectively to operate simultaneously said connector elements into their active and inactive positions with respect to the mounted and connected freight carrier, said mechanism accommodating variable location of said connector elements above the top of said center sill in their active positions as required to effect holding of the mounted and connecting freight carrier.

12. The railway car set forth in claim 11, wherein said mechanism essentially comprises a pair of nuts rotatably mounted in said saddle and respectively engaging a pair of threaded shanks respectively provided upon said members, a pair of worm gears respectively carried by said nuts, and a worm also rotatably mounted upon said saddle and engaging both of said worm gears.

13. The railway car set forth in claim 12, and further comprising means manually operable from either side of said center sill for selectively rotating said worm in opposite directions, wherein rotation of said worm in one direction effects simultaneous raising of said members and rotation of said worm in the opposite direction effects simultaneous lowering of said members.

14. A railway car for transporting indiscriminately road vehicles of first and second types, wherein the first type of road vehicle includes a chassis carrying road wheels of standard road gauge, and the second type of road vehicles includes a chassis carrying both road wheels of standard road gauge and track rollers of given narrow gauge depending from the underportion of the chassis and disposed inwardly of and above the road wheels carried thereby; said railway car comprising a longitudinally extending narrow hollow boxlike frame, a pair of trucks of standard rail gauge supporting the opposite ends of said frame, the opposite laterally spaced-apart sides of said frame providing on the top thereof a trackway of said given narrow gauge, a pair of longitudinally extending and laterally spaced-apart platforms respectively carried by the opposite laterally spaced-apart sides of said frame and projecting laterally outwardly therefrom and disposed below said trackway and constituting a roadway of said standard road gauge, the vertical distance between said trackway and said roadway being greater than the vertical distance between the bottom of the track rollers and the bottom of the road wheels carried by the chassis of the second type road vehicle, whereby said trackway is arranged to engage and to support the track rollers carried by the chassis of the second type road behicle so as to mount the same upon the top of said frame with the road wheels thereof projecting laterally outwardly over said roadway and positioned thereabove and out of contact therewith, the vertical distance between said trackway and said roadway being less than the vertical distance between the underportion of the chassis and the bottoms of the road wheels carried by the chassis of the first type road vehicle, whereby said roadway is arranged to engage and to support the road wheels of the first type road vehicle so as to mount the same upon the top of said frame with the chassis thereof straddling said trackway and with the underportion of the chassis thereof positioned above said trackway and out of contact therewith, shock-absorber means arranged in said hollow frame, and means for interconnecting said shock-absorber means and a road vehicle mounted upon the top of said frame regardless of the type thereof, thereby to prevent the transmission of severe shocks from said frame to the mounted road vehicle while accommodating limited rolling movements of the mounted road vehicle longitudinally along said frame.

References Cited in the file of this patent

UNITED STATES PATENTS

| | | |
|---|---|---|
| 683,770 | Jones | Oct. 1, 1901 |
| 1,470,266 | Kirchner | Oct. 9, 1923 |
| 1,649,598 | Kirchner | Nov. 15, 1927 |
| 1,813,294 | Hunt | July 7, 1931 |
| 2,047,954 | Fitch | July 21, 1936 |
| 2,072,988 | Kellett | Mar. 9, 1937 |
| 2,128,364 | Kellett | Aug. 30, 1938 |
| 2,144,081 | Porte | Jan. 17, 1939 |
| 2,166,948 | Fitch | July 25, 1939 |
| 2,178,693 | McMullen | Nov. 7, 1939 |

FOREIGN PATENTS

| | | |
|---|---|---|
| 1,114,202 | France | Dec. 12, 1955 |

OTHER REFERENCES

"NH Sees Cut in Piggyback Costs," in Railway Age, March 7, 1955; pages 45, 46, and 47. (Copy available in class 105–368.5, Division 34.)

"Unveil New Plan for Piggy-Backs," in Modern Railroads; October 1953, pages 46 and 47. (Copy available in class 105–368.5, Division 34.)

UNITED STATES PATENT OFFICE

CERTIFICATION OF CORRECTION

Patent No. 2,960,043 November 15, 1960

Deodat Clejan

It is hereby certified that error appears in the above numbered patent requiring correction and that the said Letters Patent should read as corrected below.

Column 7, line 12, for "connection" read -- connector --; column 11, line 7, for "behicle" read -- vehicle --.

Signed and sealed this 9th day of May 1961.

(SEAL)
Attest:

ERNEST W. SWIDER
Attesting Officer

DAVID L. LADD
Commissioner of Patents